Nov. 6, 1956 A. H. STEFFEN 2,769,858
PORTABLE REAR SEAT SPEAKER
Filed March 29, 1955
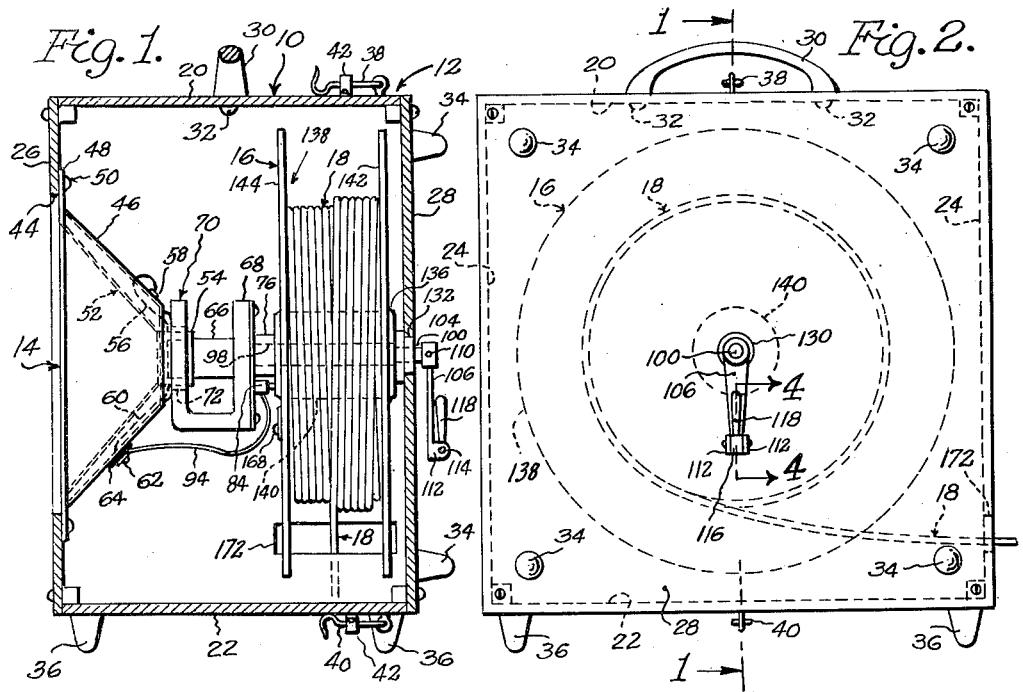
Fig. 1. Fig. 2.
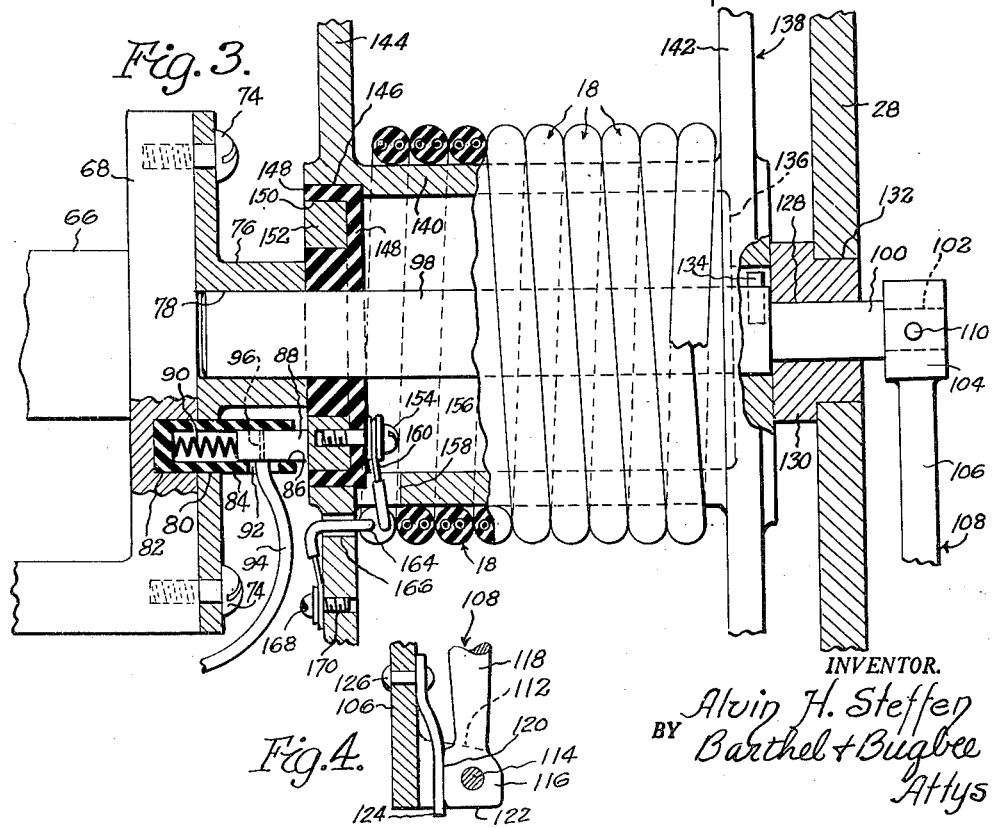
Fig. 3.
Fig. 4.
INVENTOR.
Alvin H. Steffen
BY Barthel + Bugbee
Attys

United States Patent Office 2,769,858
Patented Nov. 6, 1956

2,769,858

PORTABLE REAR SEAT SPEAKER

Alvin H. Steffen, Detroit, Mich.

Application March 29, 1955, Serial No. 497,657

4 Claims. (Cl. 179—1)

This invention relates to loud speakers for radio sets and the like and, in particular, to portable loud speakers.

One object of this invention is to provide a portable loud speaker equipped with a self-contained cable reel whereby the loud speaker can be carried to a location at a distance from the radio receiving set itself, such as, for example, when it is desired to listen to an automobile radio at some distance from the automobile.

Another object is to provide a portable loud speaker of the foregoing character which is especially adapted for use as a so-called automobile rear seat loud speaker wherein the loud speaker is capable not only of being used in its normal position in the rear or passenger compartment of the automobile, but may also be taken outside the automobile entirely without interrupting its use.

Other objects and advantages of the invention will become apparent during the course of the following description of the accompanying drawing, wherein:

Figure 1 is a central vertical section through a portable loud speaker according to one form of the invention, taken along the line 1—1 in Figure 2;

Figure 2 is a rear elevation of the portable loud speaker shown in Figure 1;

Figure 3 is an enlarged fragmentary side elevation, partly in central vertical section, through the cable reel shown in the central right-hand portion of Figure 1; and Figure 4 is an enlarged fragmentary vertical section, partly in side elevation, of the folding cable winding crank shown in Figure 1.

Frequently, in the use of an automobile radio, it has been desired to listen to the radio at a distance from the automobile, such as during picnics or similar outings. Hitherto, however, the loud speaker in the front compartment of the automobile has been permanently mounted on the dash and, where a so-called rear seat loud speaker has been provided, it likewise has been permanently and immovably mounted in the rear passenger compartment of the automobile. For these reasons, it has not been possible with conventional automobile radios to listen to them easily at a distance from the automobile.

The present invention provides a portable loud speaker which is especially well adapted for use as an automobile rear seat loud speaker in the same manner as the previously used immovable rear seat loud speakers. The portable loud speaker of the present invention, however may, if desired, be unlatched from its position within the automobile and quickly and easily carried to a location outside the automobile, without interrupting the radio program being listened to, because the loud speaker casing contains its own supply of cable which is automatically unreeled as the user carries the loud speaker unit away from the automobile. In this manner, the owner of the automobile or his guests may listen to radio programs while at a picnic or occupied in other activities, at a distance from the automobile.

Referring to the drawings in detail, Figures 1 and 2 show a portable loud speaker unit, generally designated 10, according to one form of the invention, as mounted in a casing 12 containing the loud speaker, generally designated 14, and a cable reel, generally designated 16, carrying the cable 18 by which the loud speaker 14 is connected to the radio receiving set (not shown). The radio receiving set is conventional and its details are beyond the scope of the present invention.

The casing 12 is provided with top and bottom walls 20 and 22, side walls 24 and front and rear walls 26 and 28 respectively. The top wall 20 is provided with a carrying handle 30 which is bolted or otherwise secured thereto as at 32. The rear wall 28 and bottom wall 22 are provided with feet 34 and 36 respectively for supporting the unit 10 either in a horizontal or vertical position, according to the circumstances. Latch hooks 38 and 40 are also mounted on the top and bottom walls 20 and 22 respectively for the purpose of latching the unit 10 to a support, such as the shelf behind the rear seat of a passenger automobile. Clips 42 are provided for holding the latches 38 and 40 in their retracted positions when they are not in use.

The front wall 26 is provided with an opening or aperture 44 behind which the metal cone 46 of the loud speaker 14 is mounted and held in place by the usual mounting ring 48 secured thereto by the fasteners 50. The loud speaker 14 is conventional and is provided with a conventional diaphragm 52 of any suitable kind which is secured to the mounting ring 48 of the cone 46 and at its rearward end is secured to the forward end of a conventional voice coil (not shown), one lead 56 from which is grounded as at 58 to the metal cone 46 and the other lead 60 is secured to a terminal 62 which is insulated from the cone 46 by the insulating disc 64.

The voice coil is mounted for oscillation within the magnetic core 66 of a loud speaker actuating motor, generally designated 70 and core 66 is supported by a U-shaped element 68, in turn, supported by metal cone 46. Support 68 is provided with a bore 72 of sufficient size to accommodate a bushing 54 which supports one end of the magnet. The rearward arm of the support 68 is secured as by the fasteners 74 to a flanged bearing bushing 76 containing a bore 78 (Figure 3). The flanged bushing 76 is also provided with a hole 80 aligned with a socket 82, both of which receive a cup-shaped insulating member 84, in the form of a cylinder with one end closed and containing a bore 86. Reciprocably mounted in the bore 86 is a metallic or other conducting contact brush 88 in the form of a plunger urged to the right by a compression spring 90 mounted in the bottom of the bore 86. The cup-shaped insulating member 84 is provided with a slot 92 communicating with the plunger or brush 88 and serving for the passage of an insulated wire 94, the end of which is mounted in a transverse hole 96 in the plunger or brush 88. The opposite end of the wire 94 is connected at the terminal 62 to the wire 60 leading to the voice coil.

Rotatably mounted in the bore 78 of the flanged bushing 76 is a reel shaft 98 (Figure 3), the opposite end portion 100 of which is of reduced diameter and has a still further reduced diameter end portion 102 carrying the hub 104 on the arm 106 of a hand crank 108 pinned or otherwise secured thereto as at 110. The crank arm 106 on its outer end is provided with spaced parallel ears 112 (Figure 4) which are drilled to receive a pivot pin 114 upon which the hub 116 of a handle 118 is rockably mounted. The hub 116 is provided with flattened edges 120 and 122 at right angles to one another and adapted to be selectively engaged by the free end of a leaf spring 124, the opposite end of which is secured as by the fastener 126 to the crank arm 106. As a consequence, the handle 118 may be moved parallel to or perpendicular to the arm 106 and yieldably held in that position by the spring 124, as desired, depending upon whether it is desired to fold the handle 118 for transportation or other purposes, as shown in Figures 1, 2 and 4, or to extend it into perpendicularity to the arm 106 in order to operate the crank 108 in order to rotate the shaft 100.

The reduced diameter portion 100 of the shaft 98 is journaled in the bearing bore 128 of a stepped bearing bushing 130, the outer end of which is fixedly secured in a bore 132 in the center of the rear wall 28 of the casing 12. Keyed, pinned or otherwise secured as at 134 to the shaft 98 is one end wall 136 of a cable reel, generally designated 138, having a cylindrical drum portion 140 and spaced parallel flanges or discs 142 and 144 located respectively at opposite ends of the drum 140. The disc 144 is provided with a cylindrical recess 146 in the center thereof in which is mounted an insulating disc 148 of suitable electrical insulating material and containing an annular groove 150 in which is seated a contact ring 152 engaged by the brush 88. The contact ring 152 is of metal or other conducting material and is bored and threaded to receive a terminal screw 154 which also passes through the insulating disc 148. The head of the screw 154 lies within the chamber 156 inside the drum or hub 140 of the cable reel 138 which has a hole 158 therein. Secured to the terminal screw 154 and extending outwardly therefrom through the hole 158 is one end of an insulated wire 160 forming one conductor of the flexible two-conductor cable 18, the other insulated wire 164 of which passes through a hole 166 and emerges on the outer side of the flange 144 and is secured thereto by the terminal screw 168 threaded into the drilled and threaded hole 170 therein.

The cable 18 is wound upon the drum 140 in successive layers (Figure 1), the outer end of the cable 18 passing outward through an aperture 172 in one of the side walls 24 of the casing 12. The cable 18 leads to the usual loud speaker connections within the automobile, as described above, and requiring no further mention.

In the normal use of the portable loud speaker unit 10 within the automobile, the casing 12 is latched in any suitable position by means of the hook 40, such as to the rear deck or shelf above and behind the rear seat. In this position, the two-conductor cable 18 conveys to the voice coil the oscillating electric current from the usual audio amplifier of the radio receiving set. Contact is made between the cable wire 164 and the voice coil terminal 58 through the "ground" connection of both to the metal parts 144, 98, 76, 68 and 46 interconnecting them. The connection to the remaining wire 160 of the cable 18 is made through the contact ring 152, the brush 88, the wire 94, the terminal 62 and the wire 60 leading to the voice coil. The portable speaker unit 10 while within the automobile thus performs all the functions of the stationary or immovable loud speaker associated with the automobile radio receiving set.

When, however, the user wishes to listen to his automobile radio at a distance from the automobile, he unlatches the latch 40 and by means of the handle 30 carries the portable loud speaker unit 10 outward through the door or window of the car to the picnic table or other location where he desires to place it, unreeling the flexible cable 18 as he walks away from the automobile. As the cable 18 becomes unwound as it passes through the opening 172 in the casing side wall 24, contact with the voice coil is maintained by the constant engagement of the brush 88 with the contact ring 152, by reason of the presence exerted by the compression spring 90 (Figure 3) so that contact is not lost, and the loud speaker 14 remains in operation even while it is being carried.

When the user wishes to return the loud speaker unit 10 to the automobile, he pulls the handle 118 of the hand crank 108 downward into its perpendicular position at right angles to the crank arm 106 and turns the hand crank 108 to rotate the shaft 98 and cable drum 138 while he approaches the automobile, thereby winding up the cable 18 upon the arm 140 of the cable reel 138. Having replaced the loud speaker unit 10 within the automobile and wound up the necessary length of cable 18, he reattaches the hook 40 to its connection with the rear deck or shelf of the automobile, after which the loud speaker unit 10 is ready for service in its usual way.

What I claim is:

1. A portable rear seat speaker for use in automobiles comprising a housing, means on said housing adapted to releaseably mount said housing on a portion of an automobile at the rear of a seat, a generally conical speaker, electric motor means operable to drive said speaker, support means mounting said motor means generally coaxially with and in operative relation to said speaker, a reel, bearing means on said support means and said housing rotatably supporting said reel, an electrical conductor wound on said reel, means electrically connecting one end of said conductor to said motor means, the other end of said conductor extending outwardly of said housing and being adapted to be connected to an amplifier of the type used in automobile radio receivers, and means operable to turn said reel for paying out said conductor and reeling said conductor in so that said speaker can be operated inside or outside of an automobile with which it is adapted to be used.

2. The portable rear seat speaker defined in claim 1 wherein said conical speaker and said reel are disposed generally coaxially on said housing.

3. The portable rear seat speaker defined in claim 2 wherein said reel is axially displaced from said speaker and said motor means.

4. The portable rear seat speaker defined in claim 1 wherein said means operable to turn said reel includes means forming a manually operable handle outside of said housing.

References Cited in the file of this patent

UNITED STATES PATENTS

| | | |
|---|---|---|
| 1,442,999 | Boyle | Jan. 23, 1923 |
| 2,078,321 | Freimann | Apr. 27, 1937 |
| 2,197,691 | Gerlach | Apr. 16, 1940 |